United States Patent
Karagoulis et al.

(10) Patent No.: US 11,224,933 B2
(45) Date of Patent: Jan. 18, 2022

(54) WELD GUN CAP DRESSER CUTTER

(71) Applicant: GM Global Technology Operations LLC, Detroit, MI (US)

(72) Inventors: Michael J. Karagoulis, Okemos, MI (US); Zhenke Teng, Troy, MI (US); Joseph Seme, Hudson, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 479 days.

(21) Appl. No.: 16/260,431

(22) Filed: Jan. 29, 2019

(65) Prior Publication Data

US 2020/0238430 A1  Jul. 30, 2020

(51) Int. Cl.
  *B23B 5/16*  (2006.01)
  *B23K 11/30*  (2006.01)
  *B23K 11/31*  (2006.01)

(52) U.S. Cl.
  CPC .......... *B23K 11/3063* (2013.01); *B23B 5/166* (2013.01); *B23K 11/314* (2013.01)

(58) Field of Classification Search
  CPC ....... B23B 5/166; B23C 3/12; B23K 11/3063; B23K 37/08
  See application file for complete search history.

(56) References Cited

U.S. PATENT DOCUMENTS

| | | | |
|---|---|---|---|
| 7,972,194 B2 | 7/2011 | Call et al. | |
| 2017/0225262 A1* | 8/2017 | Sigler | B23K 11/3063 |
| 2017/0225263 A1* | 8/2017 | Sigler | B23K 11/3063 |
| 2018/0236593 A1* | 8/2018 | Lanham | B23K 11/3063 |

FOREIGN PATENT DOCUMENTS

| | | |
|---|---|---|
| CN | 102083576 A | 6/2011 |
| CN | 204893191 U | 12/2015 |
| CN | 106903418 A | 6/2017 |
| CN | 207309186 U | 5/2018 |
| CN | 207593034 U | 7/2018 |
| CN | 108367379 A | 8/2018 |
| DE | 29714320 U1 | 10/1997 |

(Continued)

OTHER PUBLICATIONS

First Office Action for Application No. 202010025447; dated Jun. 21, 2021; 9 pages.

*Primary Examiner* — Alan Snyder
(74) *Attorney, Agent, or Firm* — Cantor Colburn LLP (57) ABSTRACT

A tip dresser cutter including a circumferential portion having a circular shape rotatable about an axis of rotation, a center portion located radially inward from the circumferential portion proximate the axis of rotation, and a cutting flute extending radially between the center portion and the circumferential portion. The cutting flute including a leading edge, a trailing edge, a radially inward canted surface extending between the leading edge and the trailing edge. The radially inward canted surface includes a first section extending between the center portion and a first location on the cutting flute and a second section extending between the first location on the cutting flute and a second location on the cutting flute. The second section of the radially inward canted surface including a curved portion that is parallel to a plane of rotation of the cutting flute.

20 Claims, 11 Drawing Sheets

(56) References Cited

FOREIGN PATENT DOCUMENTS

| | | | | |
|---|---|---|---|---|
| DE | 19930485 | C1 | 5/2001 | |
| DE | 102012008257 | A1 | 10/2013 | |
| EP | 0844040 | A1 | 5/1998 | |
| EP | 2769798 | A1 * | 8/2014 | ............ B23B 5/166 |
| JP | 2012210636 | A | 11/2012 | |

\* cited by examiner

WELD GUN CAP DRESSER CUTTER

INTRODUCTION

The subject disclosure relates to a tip dresser for resistance welding weld gun caps, and more particularly to cutter flutes for a weld gun cap dresser.

Resistance weld guns are employed to weld metal parts together, such as welding body panels together on a vehicle. Such weld guns may have a pair of arms, with weld gun caps on each arm that are brought together on opposite sides of the material to be welded before performing the welding operation. These weld gun caps (copper weld caps) periodically need to be dressed. Dressing involves bringing the pair of weld gun caps into contact with the cutting flutes in a tip dresser cutter of a tip dresser tool. The tip dresser cutter is rotated, causing the cutting flutes to dress the weld gun caps (somewhat similar to sharpening a pencil in a pencil sharpener). It is important for smooth and controlled cutting, when dressing the weld gun caps, that the tip dresser cutter is maintained firmly in relation to the weld gun caps. If the tip dresser cutter is not maintained firmly in relation to the weld gun caps then the weld gun may chatter within the tip dresser cutter, producing irregular and/or uncontrolled shapes on the weld gun caps. Chatter is undesirable for weld quality and maintenance reasons.

Accordingly, it is desirable to have a better apparatus for dressing the weld gun caps for a resistance weld gun.

SUMMARY

In one exemplary embodiment a tip dresser cutter is provided. The tip dresser cutter includes a circumferential portion having a circular shape rotatable about an axis of rotation, a center portion located radially inward from the circumferential portion proximate the axis of rotation, and a cutting flute extending radially between the center portion and the circumferential portion. The cutting flute including a leading edge, a trailing edge, a radially inward canted surface extending between the leading edge and the trailing edge. The radially inward canted surface includes a first section extending between the center portion and a first location on the cutting flute and a second section extending between the first location on the cutting flute and a second location on the cutting flute. The second section of the radially inward canted surface including a curved portion that is parallel to a plane of rotation of the cutting flute.

In addition to one or more of the features described herein, or as an alternative, further embodiments may include that the curved portion extends from the leading edge to the trailing edge.

In addition to one or more of the features described herein, or as an alternative, further embodiments may include that the second section of the radially inward canted surface further includes a leading step portion located proximate the leading edge.

In addition to one or more of the features described herein, or as an alternative, further embodiments may include that the second section of the radially inward canted surface further includes a trailing step portion located proximate the trailing edge.

In addition to one or more of the features described herein, or as an alternative, further embodiments may include that the second section of the radially inward canted surface further includes a leading edge portion located proximate the leading edge, the leading edge portion including a smooth transition to the curved portion that is recessed relative to the leading edge portion.

In addition to one or more of the features described herein, or as an alternative, further embodiments may include that the second section of the radially inward canted surface further includes: a trailing step portion located proximate the trailing edge, wherein the curved portion is located interposed between the leading edge portion and the trailing step portion.

In addition to one or more of the features described herein, or as an alternative, further embodiments may include that the leading step portion extends from the leading edge to a leading step location and the curved portion extends from the trailing edge to the leading step location.

In addition to one or more of the features described herein, or as an alternative, further embodiments may include that the leading edge portion extends from the leading edge to a transition location and the curved portion extends from the trailing edge to the transition location.

In addition to one or more of the features described herein, or as an alternative, further embodiments may include that the leading step portion is located at a first radius away from the axis of rotation of the tip dress cutter and the curved portion is located at a second radius away from the axis of rotation of the tip dress cutter, the second radius being greater than the first radius.

In addition to one or more of the features described herein, or as an alternative, further embodiments may include that the leading edge portion at the leading edge is located at a first radius away from the axis of rotation of the tip dress cutter and the curved portion is located at a second radius away from the axis of rotation of the tip dress cutter, the second radius being greater than the first radius In addition to one or more of the features described herein, or as an alternative, further embodiments may include that the leading edge portion extends from the leading edge to a transition location, the trailing step portion extends from the trailing edge to a trailing step location, and the curved portion extends from the transition location to the trailing step location.

In addition to one or more of the features described herein, or as an alternative, further embodiments may include that the leading edge portion at the leading edge is located at a first radius away from the axis of rotation of the tip dress cutter and the curved portion is located at a second radius away from the axis of rotation of the tip dress cutter, the second radius being greater than the first radius.

In addition to one or more of the features described herein, or as an alternative, further embodiments may include that the trailing step portion is located at the first radius away from the axis of rotation of the tip dress cutter or at a position less than the second radius away from the axis of rotation of the tip dress cutter.

In addition to one or more of the features described herein, or as an alternative, further embodiments may include that each location along the curved portion of the radially inward canted surface within the second section is located at a distance away from the axis of rotation that is equivalent to a first radius.

In addition to one or more of the features described herein, or as an alternative, further embodiments may include that the curved portion is recessed into the tip dress cutter radially outward towards the circumferential portion relative to the leading step portion.

In addition to one or more of the features described herein, or as an alternative, further embodiments may include that the curved portion is recessed into the tip dress cutter radially outward towards the circumferential portion relative to the trailing step portion.

In addition to one or more of the features described herein, or as an alternative, further embodiments may include that the curved portion is recessed into the tip dress cutter radially outward towards the circumferential portion relative to the leading edge portion.

In addition to one or more of the features described herein, or as an alternative, further embodiments may include that the curved portion encompasses a portion of the radially inward canted surface within the second section and not the entire radially inward canted surface within the second section.

In addition to one or more of the features described herein, or as an alternative, further embodiments may include that the second section of the radially inward canted surface further includes: a second portion that excludes the curved portion, wherein at least one location in the second portion of the radially inward canted surface within the second section is located at a first distance away from the axis of rotation that is equivalent to a first radius, and wherein each location along the curved portion of the radially inward canted surface within the second section is located at a second distance away from the axis of rotation that is equivalent to a second radius that is greater than the first radius.

In one exemplary embodiment, a tip dresser tool for tip dressing a weld gun cap is provided. The tip dresser cutter includes a circumferential portion having a circular shape rotatable about an axis of rotation, a center portion located radially inward from the circumferential portion proximate the axis of rotation, and a cutting flute extending radially between the center portion and the circumferential portion. The cutting flute including a leading edge, a trailing edge, a radially inward canted surface extending between the leading edge and the trailing edge. The radially inward canted surface includes a first section extending between the center portion and a first location on the cutting flute and a second section extending between the first location on the cutting flute and a second location on the cutting flute. The second section of the radially inward canted surface including a curved portion that is parallel to a plane of rotation of the cutting flute.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
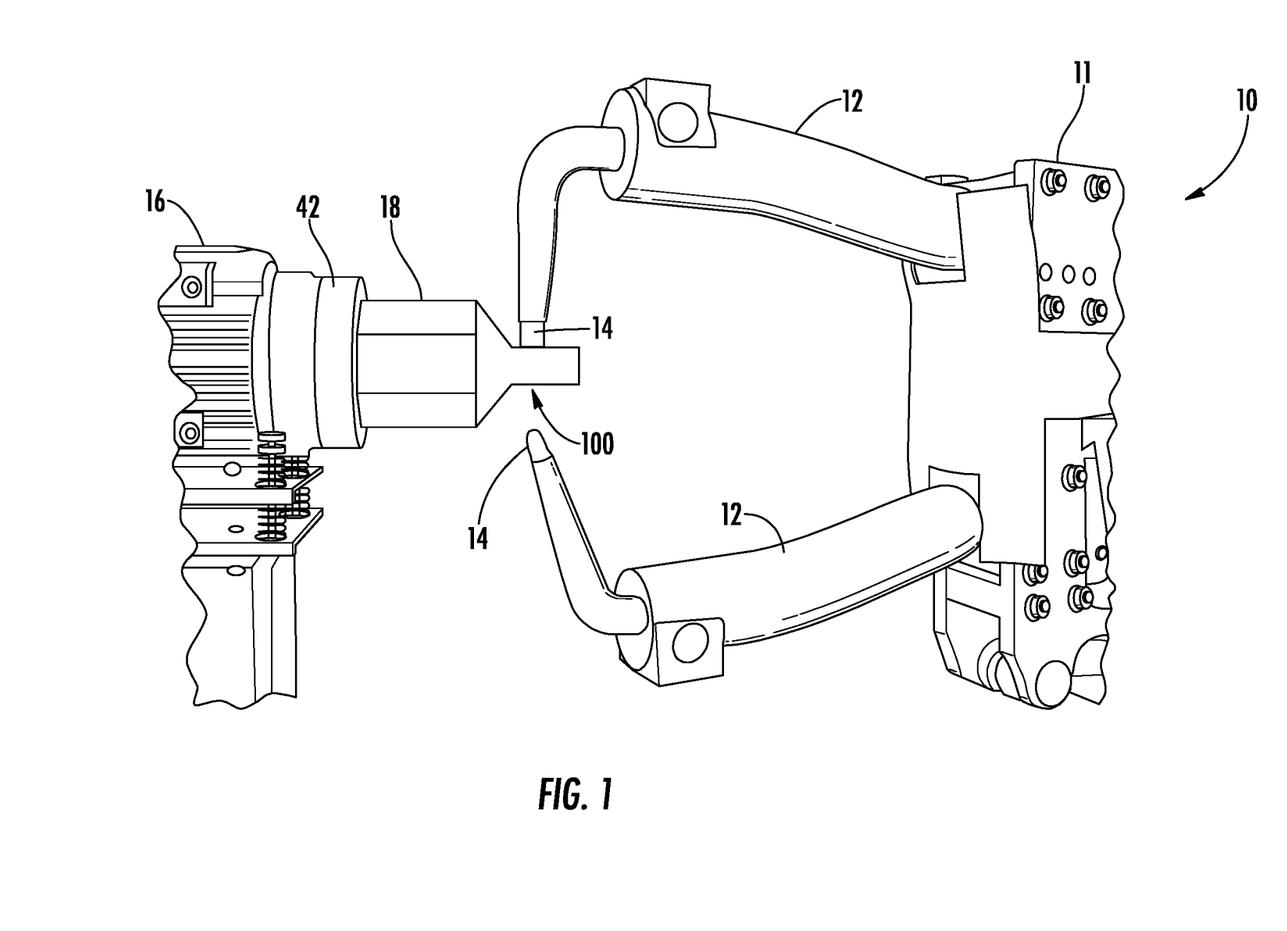
FIG. 1 is a perspective view of a portion of a tip dresser tool and the resistance weld gun assembly just prior to dressing the weld gun tip, according to an embodiment of the present disclosure.

Referring now to FIG. 1, a portion of a resistance weld gun assembly 10 that includes a pair of weld gun arms 12, which are part of a robot controlled mechanized weld gun 11 are illustrated in accordance with an embodiment of the present disclosure. Each of the weld gun arms 12 includes a weld gun cap 14. In an embodiment, the weld gun caps 14 may be copper or copper alloy weld caps. The weld gun caps 14 require periodic dressing to assure proper welds and need to be properly aligned within a tip dresser cutter 100 of a tip dresser tool 16. FIG. 1 shows the tip dresser gearbox 18 extending from a main housing 42 of the tip dresser tool 16. The robot controlled mechanized weld gun 11 is moving the weld gun arms 12 into position so the weld gun caps 14 can be dressed.

Figure 2:
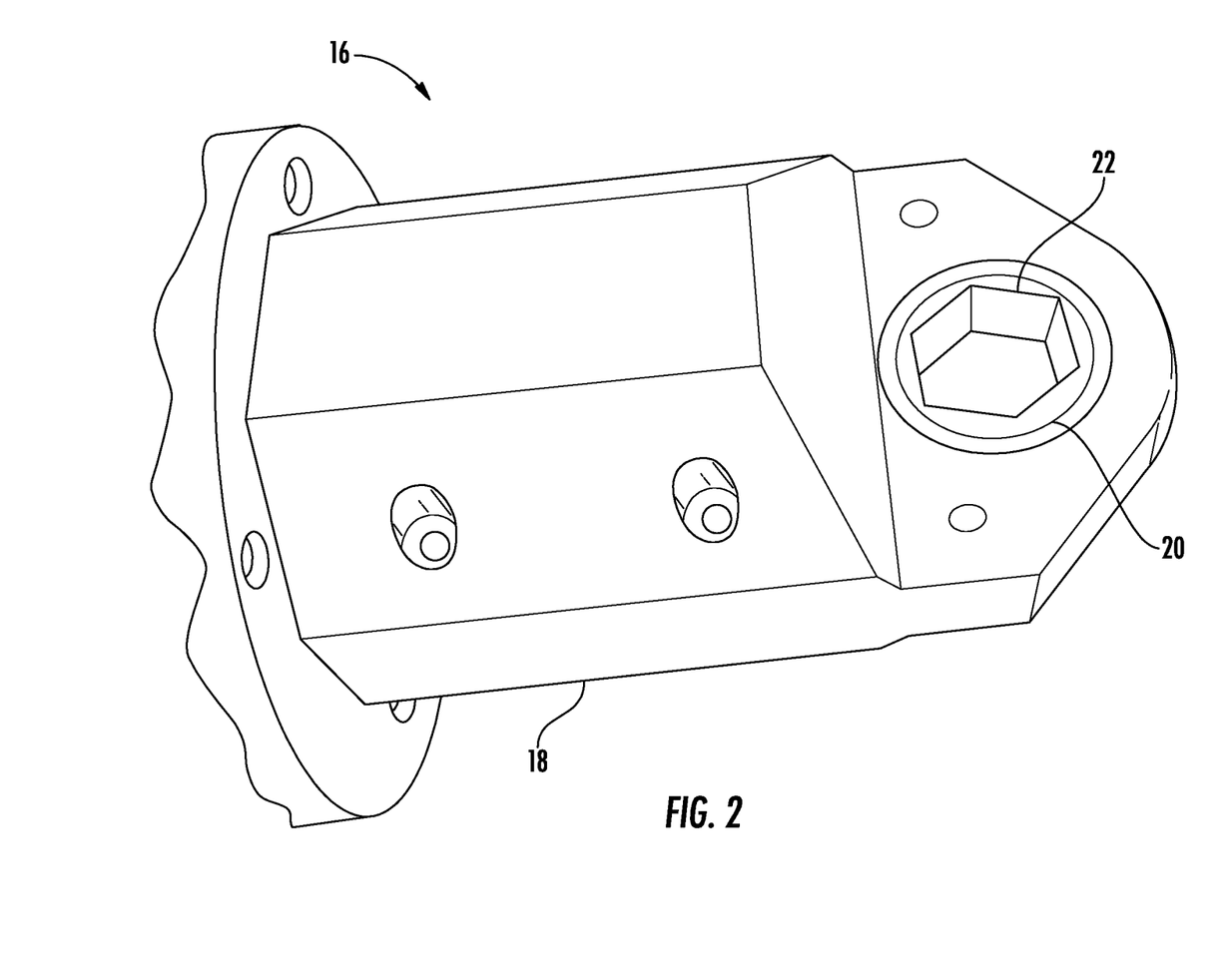
FIG. 2 is a perspective view of a portion of a tip dresser tool prior to installation of a tip dresser cutter, according to an embodiment of the present disclosure.

Referring now to FIG. 2, with continued reference to FIG. 1, a portion of the tip dresser tool 16 during dressing is illustrated, in accordance with an embodiment of the present disclosure. The tip dresser tool 16 includes a tip dresser gearbox 18 cantilevered out to a free end that includes a drive gear 20. The drive gear 20 includes a mount opening 22 therethrough and the mount opening 22 can be rotationally driven by the tip dresser tool 16. The mount opening 22 may be hexagonal, or other shape that adequately retains and drives the tip dresser cutter 100 in a rotational motion.

Figure 3:
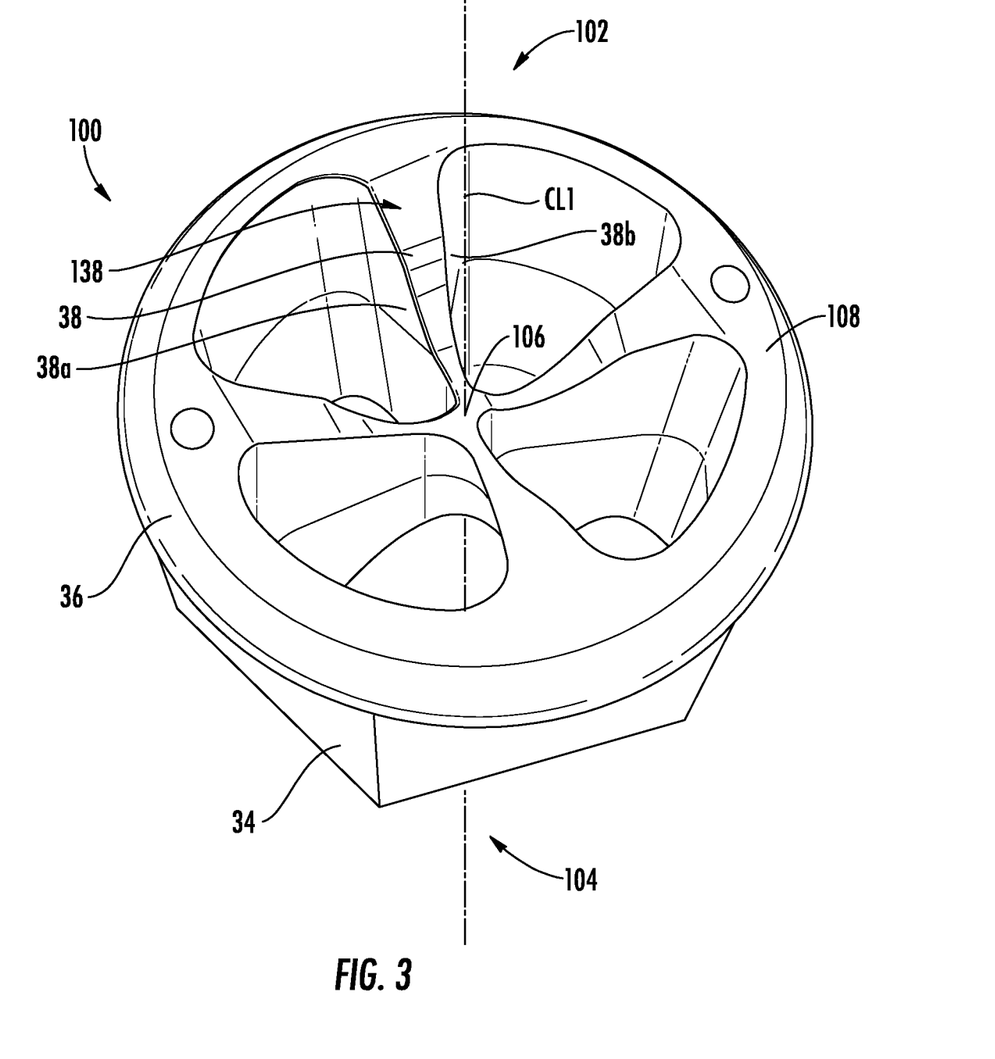
FIG. 3 is a perspective view of a portion of a tip dresser cutter, according to an embodiment of the present disclosure.

Referring now to FIG. 3, with continued reference to FIGS. 1 and 2, a tip dresser cutter 100 is illustrated, in accordance with an embodiment of the present disclosure. As shown in FIG. 3, the tip dresser cutter 100 has a hex-shaped outer surface 34 that is sized and shaped to mate with the mount opening 22 in the drive gear 20. It is understood that while the outer surface 34 is illustrated as hex-shaped in FIG. 3, the outer surface 34 of the tip dress cutter 100 may be any shape that adequately allows the tip dress cutter to be retained and driven in rotational motion within the mount opening 22. The tip dresser cutter 100 may also include a support lip 36 extending radially outward from an upper end of the tip dress cutter 100. It is understood that while the four cutting flutes 38 are illustrated in FIG. 3, the tip dresser cutter 100 may have one or more cutting flutes 38. The cutting flutes 38 extend radially between a center portion 106 of the tip dresser cutter 100 and a circumferential portion 108 of the tip dresser cutter 100. The center portion 106 is located radially inward of the circumferential portion 108. The circumferential portion may have a circular shape; it revolves around an axis of rotation CL1 centered within the circumferential portion 108, as shown in FIG. 3. The center portion 106 is located on the axis of rotation CL1 of the tip dresser cutter 100. The cutting flutes 38 may attach to the center portion 106 in line with the axis of rotation CL1, ahead of the axis of rotation CL1, or behind the axis of rotation CL1. The cutting flutes 38 are used to dress the weld gun caps 14 from both a first side 102 and a second side 104 of the tip dresser cutter 100. In an embodiment, the cutting flutes 38 are fly-cutting flutes. The cutting flutes 38 includes a leading edge 38a, a trailing edge 38b, a radially inward canted surface 138 extending between the leading edge 38a and the trailing edge 38b. The radially inward canted surface 138 may be angled towards the axis of rotation CL1, as shown in FIG. 3.

Figure 4:
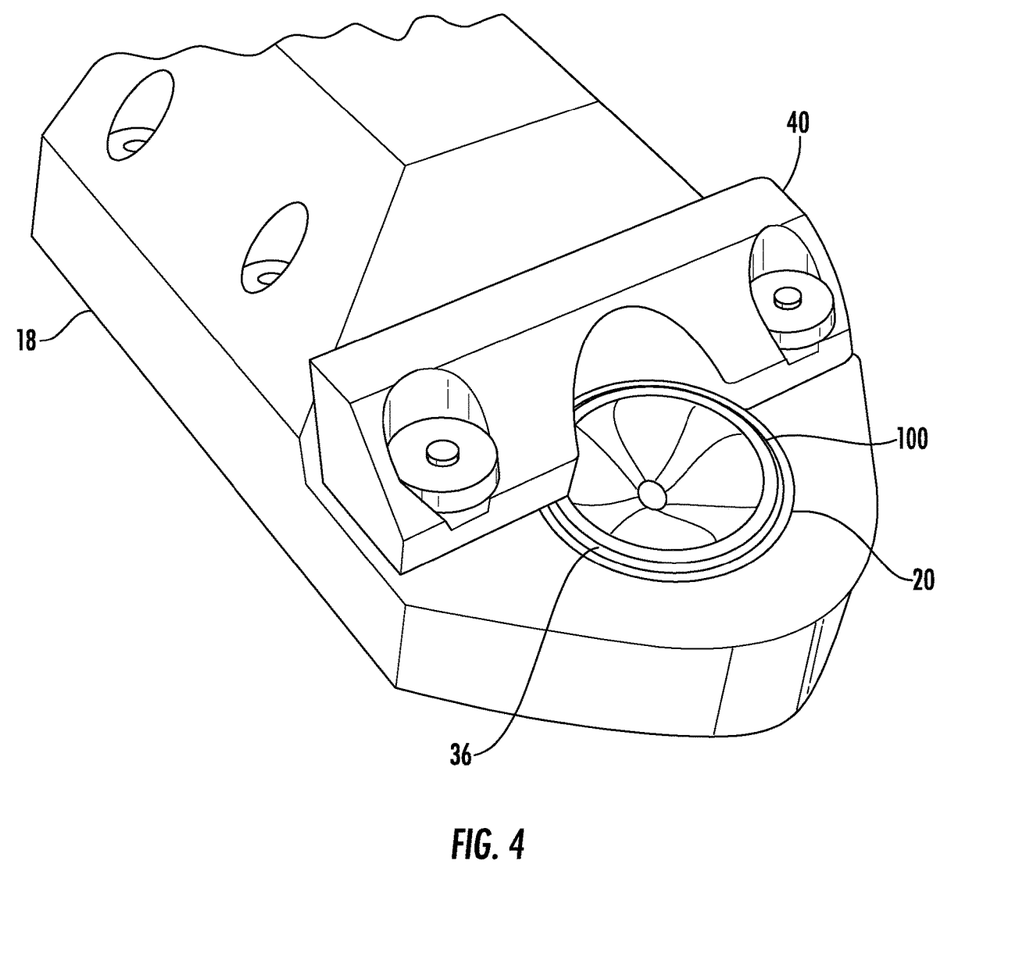
FIG. 4 is a perspective view of a portion of the tip dresser cutter within the tip dresser cutter tool, according to an embodiment of the present disclosure.

Referring now to FIG. 4, with continued reference to FIGS. 1-3, the tip dresser gearbox 18 with the tip dresser cutter 100 installed in the drive gear 20 is illustrated, in accordance with an embodiment of the present disclosure. The support lip 36 keeps the tip dresser cutter 100 from falling through the hexagonal opening 22 in the drive gear 20. A retainer 40 may be mounted on top of the tip dresser gearbox 18 to retain the tip dresser cutter 100 as the drive gear 20 is spinning the tip dresser cutter 100.

Figure 5:
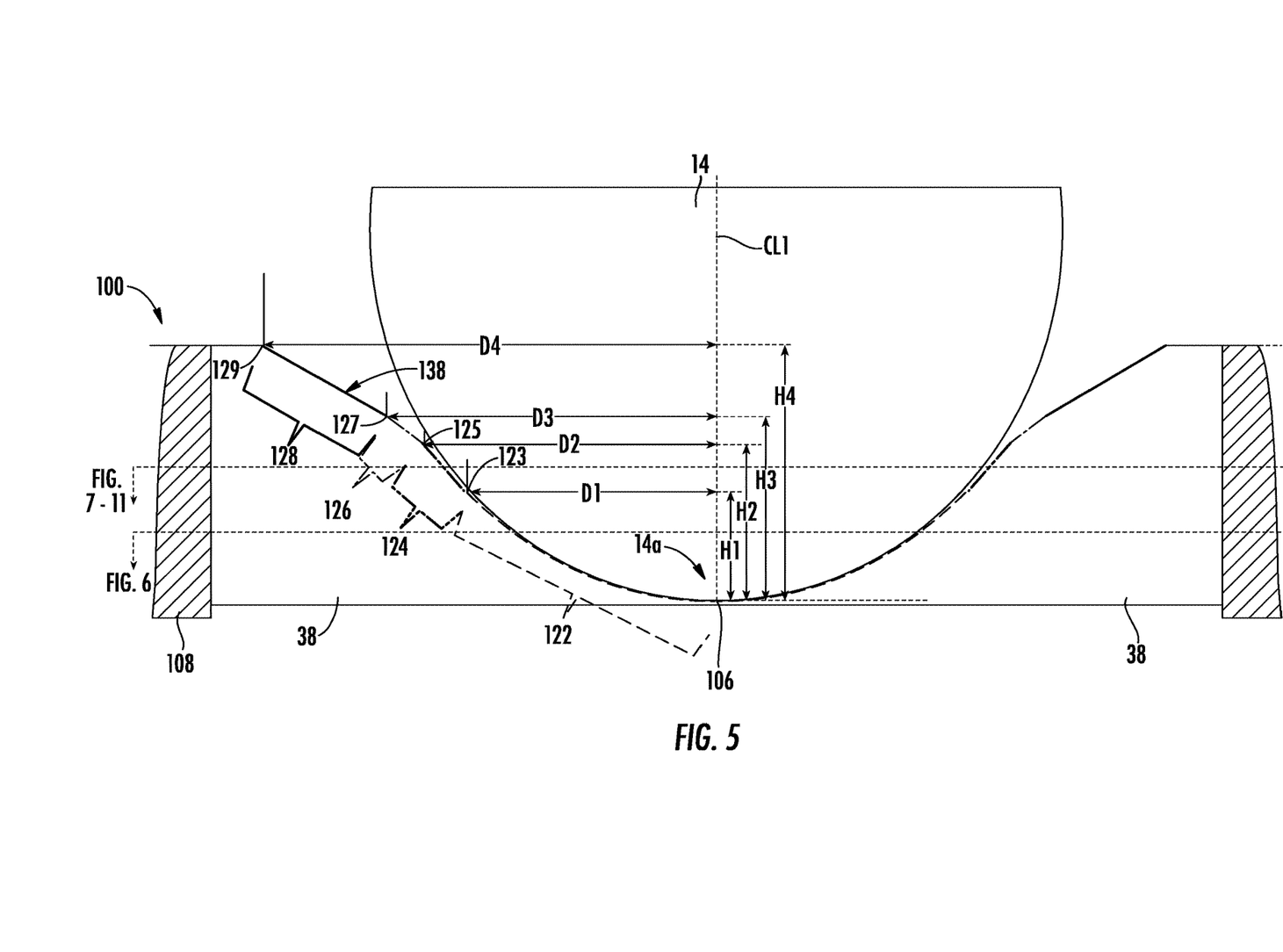
FIG. 5 is a cross-sectional side view of a weld gun cap within a tip dresser cutter, according to an embodiment of the present disclosure.

Referring now to FIG. 5, with continued reference to FIGS. 1-4, the weld gun cap 14 within the tip dresser cutter 100 is illustrated, in accordance with an embodiment of the present disclosure. The radially inward canted surface 138 of the cutting flute 38 is contoured differently in different sections 122, 124, 126, 128 from the axis of rotation CL1 of the tip dresser cutter 100 to the circumferential portion 108 to provide a stable pocket for the weld gun cap 14 to reside in while allowing for removal of chips from the end tip 14a of the weld gun cap 14 during the tip dressing operation. While only two cutting flutes 38 are illustrated in FIG. 5, each of the four cutting flutes 38 in the embodiment, illustrated in FIG. 3, may have similar contours. In broader practice, a tip dresser cutter 100 may have 1, 2, 3, 4, or more cutting flutes.

As shown in FIG. 5, the radially inward canted surface 138 of cutting flutes 38 may be segmented into four sections 122, 124, 126, 128 from the axis of rotation CL1 of the tip dresser cutter 100 to the circumferential portion 108. The radially inward canted surface 138 of the four sections 122, 124, 126, 128 may each have a different contour and each contour may serve a different purpose.

A first section 122 extends between center portion 106 proximate the axis of rotation CL1 and a first location 123. The first location 123 is located at a first height H1 as measured along the axis of rotation CL1 of tip dresser cutter 100. The axis of rotation CL1 may intersect the tip dresser cutter 100 normal the center portion 106. The first location 123 is located at a first distance D1 away from the axis of rotation CL1 of tip dresser cutter 100.

A second section 124 extends between the first location 123 and a second location 125. The second location 125 is located at a second height H2 as measured along the axis of rotation CL1 of tip dresser cutter 100. The second location 125 is located at a second distance D2 away from the axis of rotation CL1 of tip dresser cutter 100.

A third section 126 extends between the second location 125 and a third location 127. The third location 127 is located at a third height H3 as measured along the axis of rotation CL1 of tip dresser cutter 100. The third location 127 is located at a third distance D3 away from the axis of rotation CL1 of tip dresser cutter 100.

A fourth section 128 extends between the third location 127 and a fourth location 129. The fourth location 129 is located at a fourth height H4 as measured along the axis of rotation CL1 of tip dresser cutter 100. The fourth location 129 is located at a fourth distance D4 away from the axis of rotation CL1 of tip dresser cutter 100.

Figure 6:
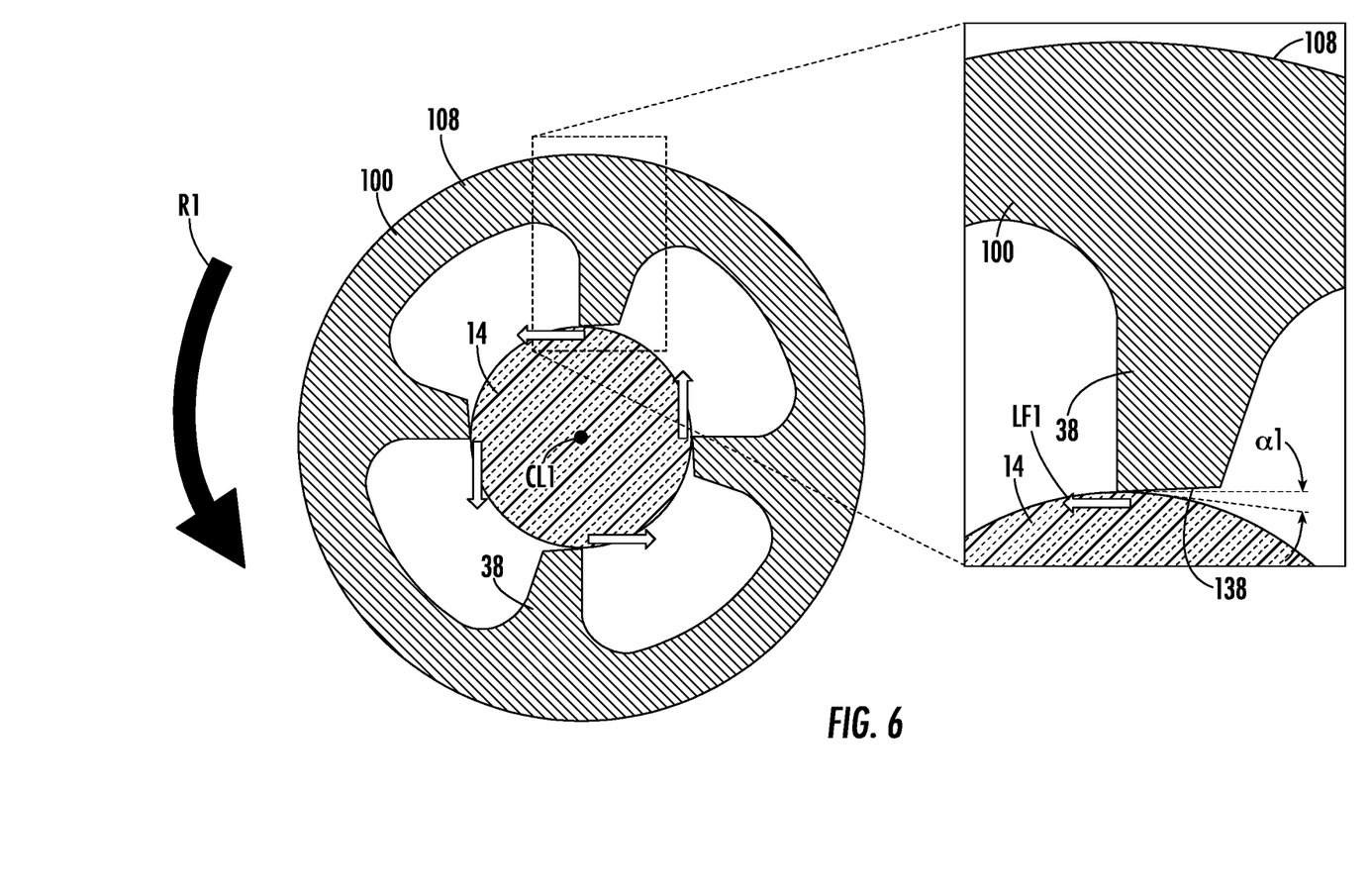
FIG. 6 is a cross-sectional top view of a weld gun cap within a tip dresser cutter, according to an embodiment of the present disclosure.

Referring now to FIG. 6, with continued reference to FIGS. 1-5, a cross sectional view of the weld gun cap 14 within the tip dresser cutter 100 at the first section 122 is illustrated, in accordance with an embodiment of the present disclosure. As shown in FIG. 6, the four cutting flutes 38 may be evenly spaced circumferentially within the circumferential portion 108 for mechanical stability during tip dressing operations. The first section 122 of the cutting flute 38 has a positive relief for aggressive cutting throughout the first section 122 of the weld gun cap 14. The end tip 14a of the weld gun cap is the primary contact point for the weld gun 11 during welding, thus this portion must be aggressively brought back into standard dimensions through by a positive relief angle. The relief angle $\alpha 1$ of the cutting flute 38 within the first section 122 is greater than 0° as measured between the radially inward canted surface 138 of the cutting flute 38 and the weld gun cap 14; thus the relief angle $\alpha 1$ within the first section 122 is referred to as a positive relief angle. The relief angle $\alpha 1$ may be defined at any given location along the radially inward canted surface 138 of the cutting flute 38. A positive relief angle may be defined as 90° minus the obtuse angle between a first plane and a second plane. The first plane is a vertical plane created by the entire leading edge 38a of the cutting flute 38 and the second plane is a tangent plane of the radially inward canted surface 138 at that specific location. This positive relief angle enables formation of chips from the weld gun cap 14 as the tip dresser cutter 100 rotates in a first direction of rotation R1. During chip formation, performed by the first section 122 of the cutting flute 38, a lateral force LF1 is placed on the weld gun cap 14 by the first section 122 of the cutting flute 38 that may tend to push the weld gun cap 14 slightly off the axis of rotation CL1 of tip dresser cutter 100. The second section 124, discussed further herein, is used to help counteract the lateral force LF1. The relief angle (e.g., $\alpha 1$ in FIG. 6 or $\alpha 2$ in FIG. 7) may be so designed to be positive, zero, or negative at any given location along the radially inward canted surface 138 of the cutting flute 38.

Figure 7:
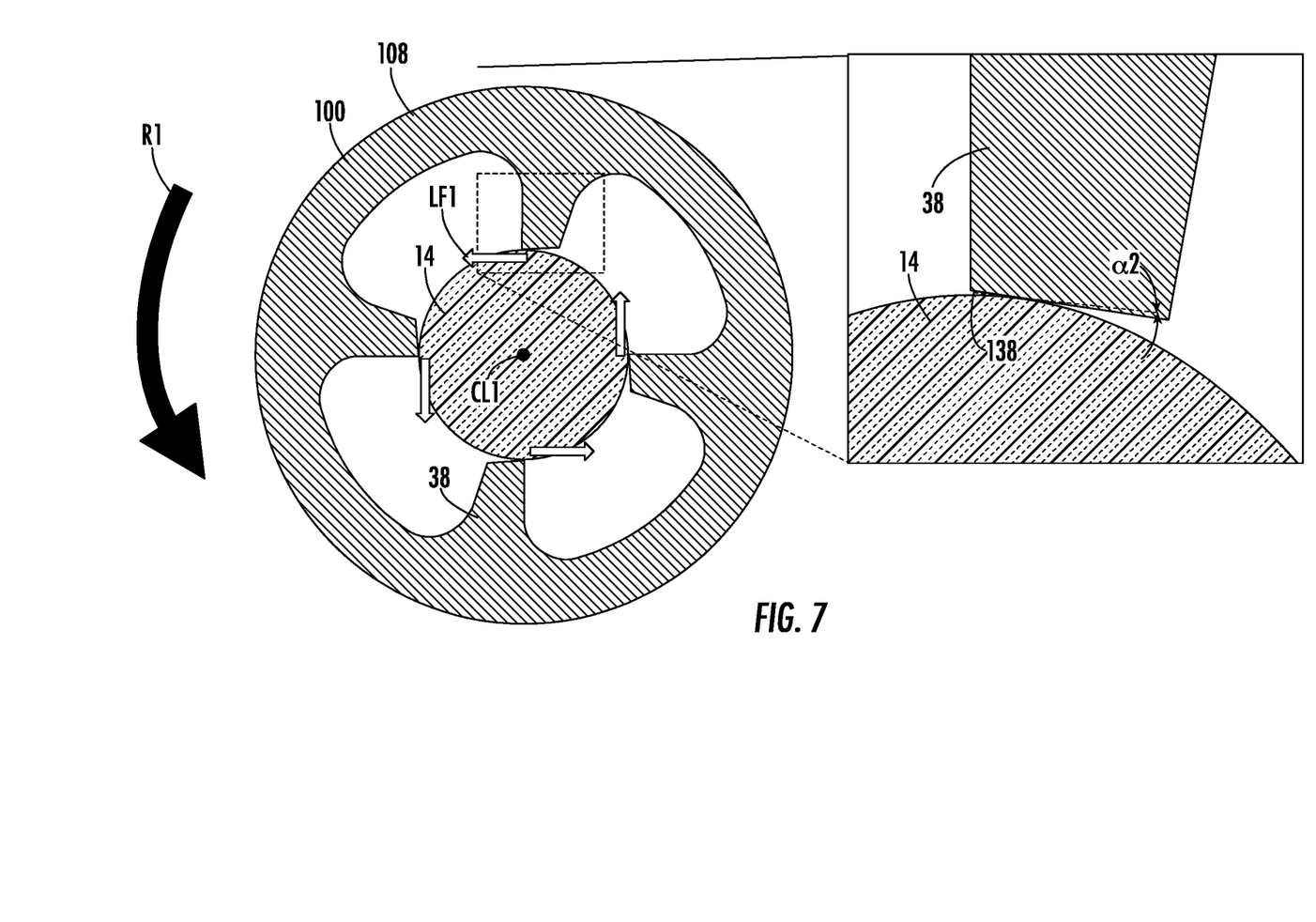
FIG. 7 is a cross-sectional top view of a weld gun cap within a tip dresser cutter, according to an embodiment of the present disclosure.

Referring now to FIG. 7, with continued reference to FIGS. 1-6, a cross sectional view of the weld gun cap 14 within the tip dresser cutter 100 at the second section 124 is illustrated, in accordance with an embodiment of the present disclosure. As shown in FIG. 7, the four cutting flutes 38 may be evenly spaced circumferentially within the circumferential portion 108 for mechanical stability during tip dressing operations. The second section 124 of the cutting flutes 38 may be designed to reduce chatter by having a zero or negative relief angle. During chip formation, performed by the first section 122 of the cutting flute 38, a lateral force LF1 is placed on the weld gun cap 14 by the first section 122 of the cutting flute 38 that may tend to push the weld gun cap 14 slightly off the axis of rotation CL1 of tip dresser cutter 100. This lateral force LF1 can initiate a jumping motion (e.g., bouncing the weld gun cap 14 back and forth within the tip dresser cutter 100) where the weld gun cap 14 is only touching two cutting flutes 38 at a single moment in time rather than all four cutting flutes 38, which may be referred to as chatter. The relief angle α2 of the cutting flute 38 within the second section 124 is less than or equal to 0° as measured between the radially inward canted surface 138 of the cutting flute 38 and the weld gun cap 14, thus the relief angle α2 within the second section 124 is referred to as a zero relief angle or a negative relief angle.

This zero relief angle or negative relief angle within the second section 124 may help reduce chatter by rubbing the weld gun cap 14 more than cutting. The rubbing helps keep the weld gun cap 14 calmly centered at the axis of rotation CL1 of tip dresser cutter 100. Thus the second section 124 serves as an important means of regulating cutter aggressiveness, since it is the only section along the leading edge that employs the negative relief angle.

Referring now to FIGS. 8-11, with continued reference to FIGS. 1-5, a cross sectional view of the weld gun cap 14 within the tip dresser cutter 100 at the second section 124 is illustrated, in accordance with an embodiment of the present disclosure. FIGS. 8-11 illustrate four possible configurations (e.g., shapes) for the radially inward canted surface 138 of each cutting flute 38 to reduce chatter even more effectively than the use of combinations of the aforementioned positive, zero, or negative relief angles at various given locations along the radially inward canted surface 138 of the cutting flute 38.

Figure 8:
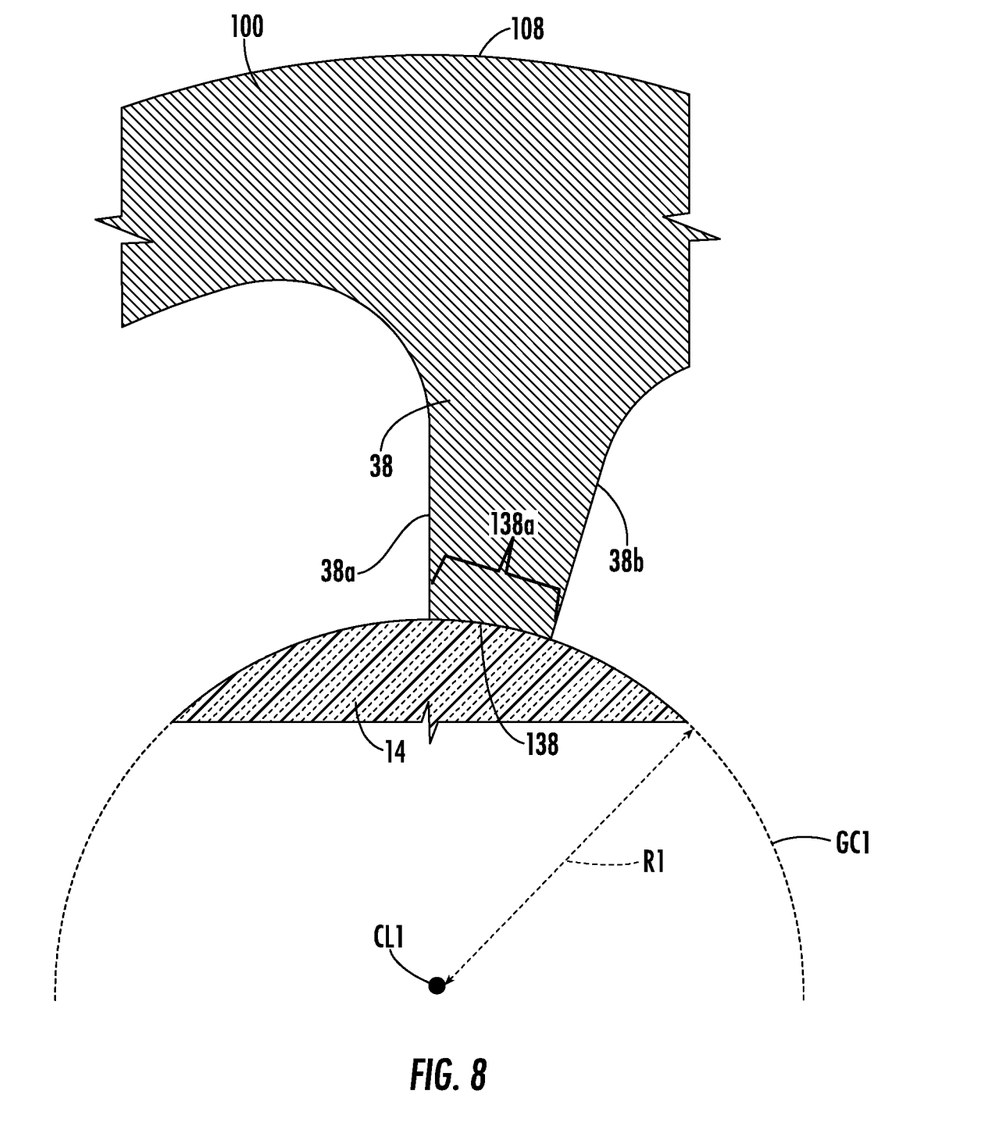
FIG. 8 is a cross-sectional top view of a weld gun cap within a tip dresser cutter, according to an embodiment of the present disclosure.

As shown in FIG. 8, the radially inward canted surface 138 of the tip dresser cutter 100 at the second section 124 may include a curved portion 138a. In an embodiment, the curved portion 138a may extend from the leading edge 38a of the cutting flute 38 to the trailing edge 38b of the cutting flute 38 (i.e., the entire radially inward canted surface 138 within the second section 124). The curved portion 138a is about parallel to a plane of rotation (e.g., see GC1) of the cutting flute 38, as shown in FIG. 8. The curved portion 138a may be curved in shape to match a curvature of the weld gun cap 14 proximate the second section 124 when the weld gun cap is located within the tip dresser cutter 100, as shown in FIG. 8. The curved portion 138a may be curved in shape to match a curvature of a first cutting flute plane of rotation GC1 revolving around the axis of rotation CL1 of the tip dresser cutter 100, as shown in FIG. 8. The first plane of rotation GC1 of the cutting flute 38 has a first radius R1 about equal to the radius (e.g., standard dimension, original blueprint/drawing dimensions, etc.) of the weld gun cap 14 proximate the second section 124 when the weld gun cap is located within the tip dresser cutter 100. Therefore, each location along the curved portion 138a of the radially inward canted surface 138 within the second section 124 is located at a distance away from the axis of rotation CL1 that is equivalent to the first radius R1. In other embodiments discussed below in FIGS. 9-11, the curved portion 138a may only encompass a portion of the radially inward canted surface 138 within the second section 124 rather the entire radially inward canted surface 138 within the second section 124, as shown in FIG. 8.

Figure 9:
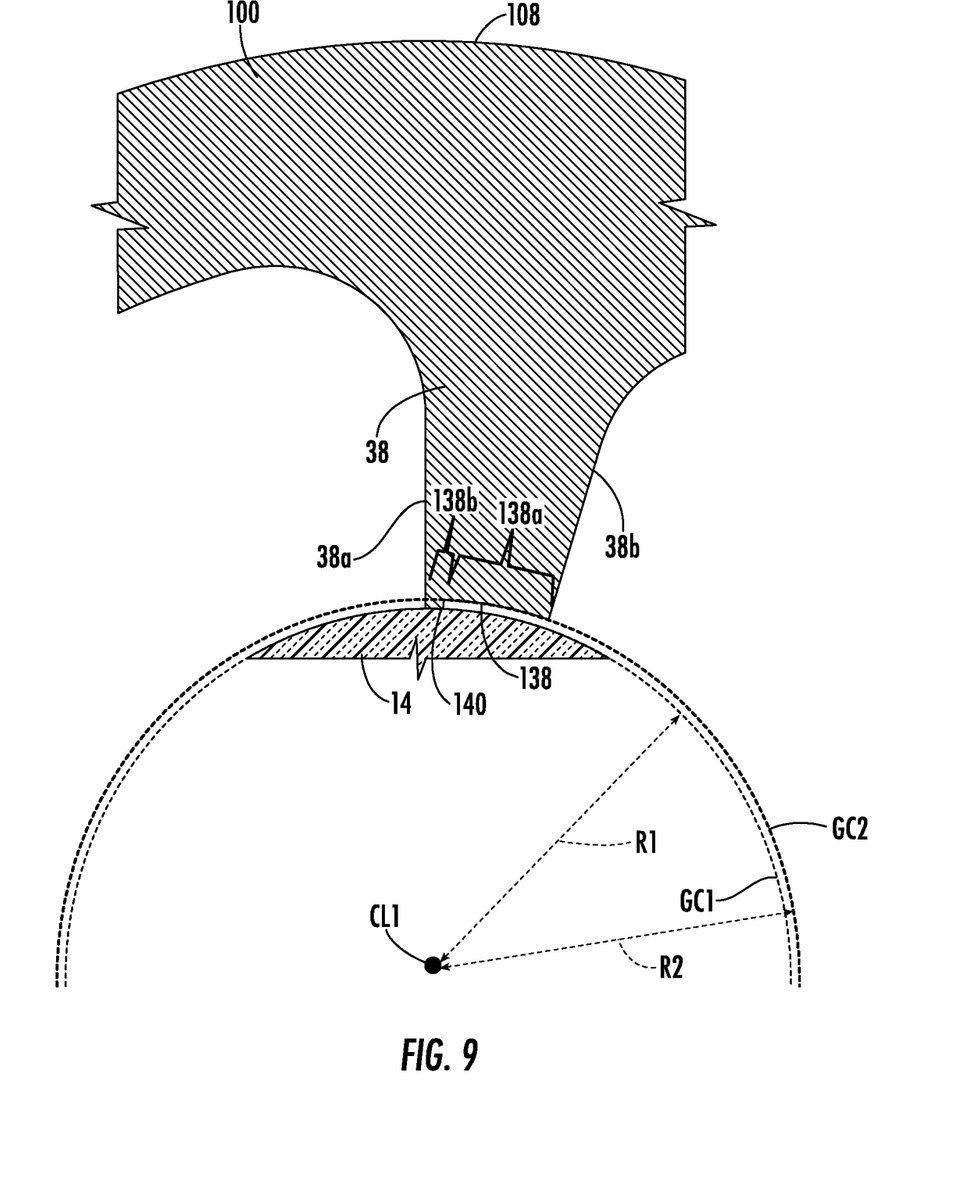
FIG. 9 is a cross-sectional top view of a weld gun cap within a tip dresser cutter, according to an embodiment of the present disclosure.

As shown in FIG. 9, the radially inward canted surface 138 of the tip dresser cutter 100 at the second section 124 may include a leading step portion 138b and a curved portion 138a. The leading step portion 138b may be located proximate the leading edge 38a of the cutting flute 38 and the curved portion 138a may be located proximate the trailing edge 38b. The leading step portion 138b extends from the leading edge 38a to a leading step location 140 and the curved portion 138a extends from the trailing edge 38b to the leading step location 140. The leading step location 140 may be a rectilinear step, as shown in FIG. 9. In an embodiment, the leading step location 140 may be located closer to the leading edge 38a than the trailing edge 38b.

The leading step portion 138b may be curved in shape, as shown in FIG. 9. The leading step portion 138b may be curved in shape to match a curvature of the weld gun cap 14 proximate the second section 124 when the weld gun cap is located within the tip dresser cutter 100. The leading step portion 138b may be curved in shape to match a curvature of a first plane of rotation GC1 of the cutting flute 38 revolving around the axis of rotation CL1 of the tip dresser cutter 100, as shown in FIG. 9. The first plane of rotation GC1 of the cutting flute 38 has a first radius R1 about equal to the radius (e.g., standard dimension, original blueprint/drawing dimensions, etc.) of the weld gun cap 14 proximate the second section 124 when the weld gun cap is located within the tip dresser cutter 100.

The curved portion 138a is about parallel to a plane of rotation (e.g., see GC2) of the cutting flute, as shown in FIG. 9. The curved portion 138a may be curved in shape to match a curvature of the weld gun cap 14 proximate the second section 124 when the weld gun cap is located within the tip dresser cutter 100. The curved portion 138a may be curved in shape to match a curvature of a second plane of rotation GC2 of the cutting flute 38 revolving around the axis of rotation CL1 of the tip dresser cutter 100, as shown in FIG. 9. The second plane of rotation GC2 of the cutting flute 38 has a second radius R2 greater than the first radius R1 of the first plane of rotation GC1 of the cutting flute 38 and greater than the radius (e.g., standard dimension, original blueprint/drawing dimensions, etc.) of the weld gun cap 14 proximate the second section 124 when the weld gun cap is located within the tip dresser cutter 100. Thus, the curved portion 138a is recessed into the tip dresser cutter 100 radially outward towards the circumferential portion 108 relative to the leading step portion 138b. Therefore, each location along the curved portion 138a of the radially inward canted surface 138 within the second section 124 is located at a distance away from the axis of rotation CL1 that is equivalent to the second radius R2.

Figure 10:
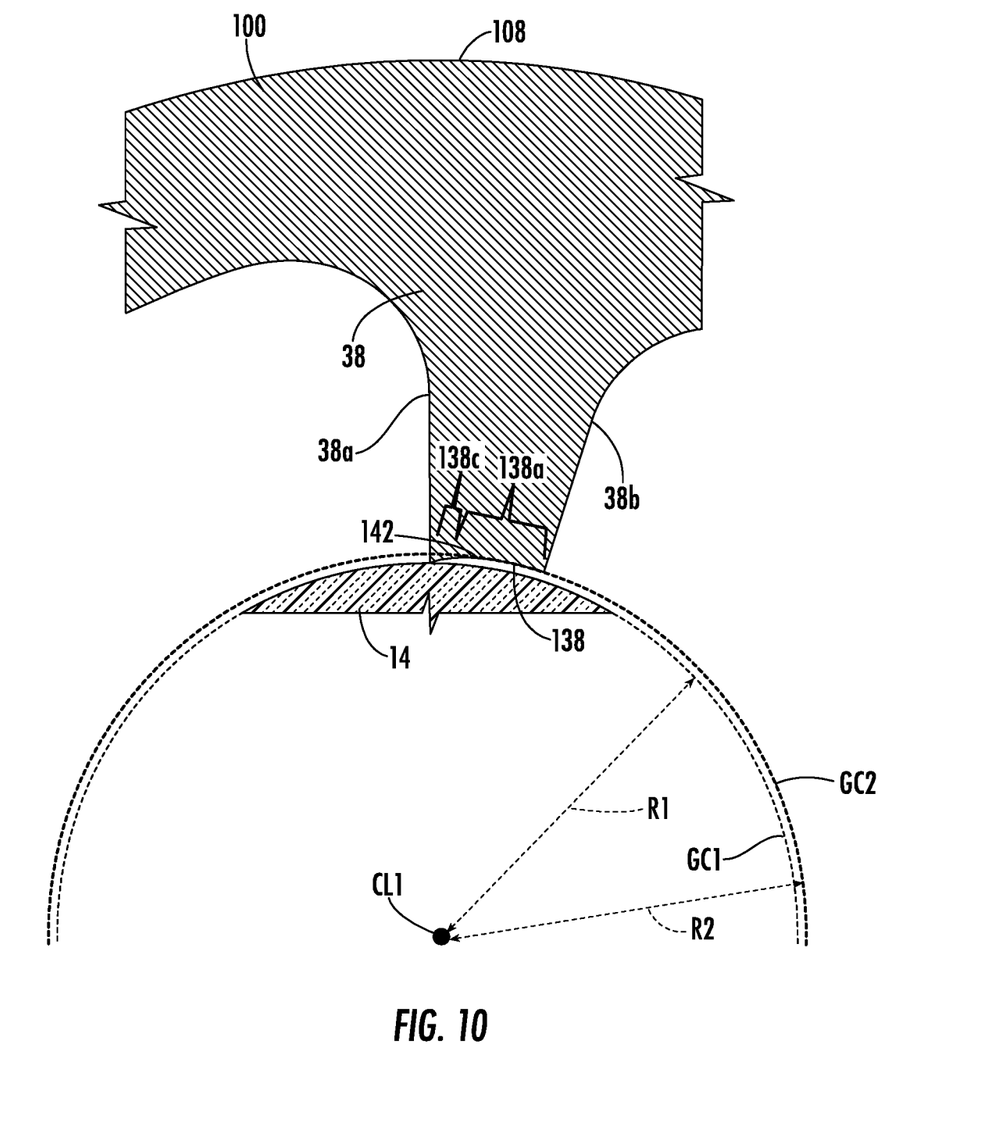
FIG. 10 is a cross-sectional top view of a weld gun cap within a tip dresser cutter, according to an embodiment of the present disclosure.

As shown in FIG. 10, the radially inward canted surface 138 of the tip dresser cutter 100 at the second section 124 may include a curved portion 138a and a leading edge portion 138c. The curved portion 138a may be located proximate the trailing edge 38b of the cutting flute 38 and the leading edge portion 138c may be located proximate the leading edge 38a. The curved portion 138a extends from the trailing edge 38b to a transition location 142 and the leading edge portion 138c extends from the leading edge 38a to the transition location 142. The leading edge portion 138c may include a smooth transition to the curved portion 138a, which is completed at the transition location 142, as shown in FIG. 10. In an embodiment, the transition location 142 may be located closer to the leading edge 38a than the trailing edge 38b, as shown in FIG. 10.

The leading edge portion 138c may be located at a first radius R1 away from the axis of rotation CL1 at the leading edge 38a and then transitions to a second radius R2 away from the axis of rotation CL1 at the transition location 142. The first radius R1 is also the radius of the first plane of rotation GC1 of the cutting flute 38, which is about equal to the radius (e.g., standard dimension, original blueprint/drawing dimensions, etc.) of the weld gun cap 14 proximate the second section 124 when the weld gun cap is located within the tip dresser cutter 100.

The curved portion 138a is about parallel to a plane of rotation (e.g., see GC2) of the cutting flute 38, as shown in FIG. 10. The curved portion 138a may be curved in shape to match a curvature of a second plane of rotation GC2 of the cutting flute 38 revolving around the axis of rotation CL1 of the tip dresser cutter 100, as shown in FIG. 10. The second plane of rotation GC2 of the cutting flute 38 has a second radius R2 greater than the first radius R1 of the first plane of rotation GC1 of the cutting flute 38 and greater than the radius (e.g., standard dimension, original blueprint/drawing dimensions, etc.) of the weld gun cap 14 proximate the second section 124 when the weld gun cap is located within the tip dresser cutter 100. Thus, the curved portion 138a is recessed into the tip dresser cutter 100 radially outward towards the circumferential portion 108 relative to the leading edge portion 138c. Therefore, each location along the curved portion 138a of the radially inward canted surface 138 within the second section 124 is located at a distance away from the axis of rotation CL1 that is equivalent to the second radius R2.

Figure 11:
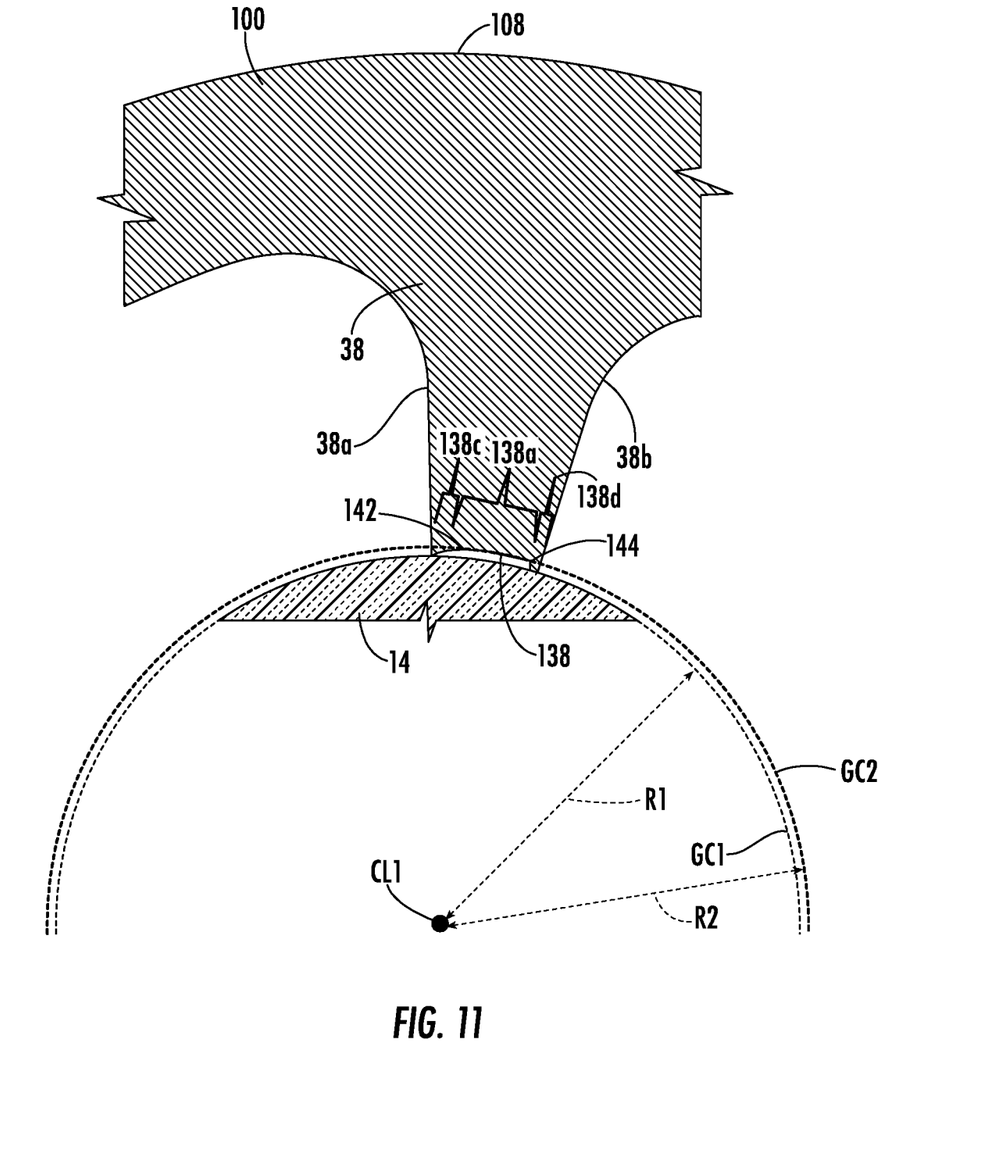
FIG. 11 is a cross-sectional top view of a weld gun cap within a tip dresser cutter, according to an embodiment of the present disclosure.

As shown in FIG. 11, the radially inward canted surface 138 of the tip dresser cutter 100 at the second section 124 may include a curved portion 138a, a leading edge portion 138c, and a trailing step portion 138d. The trailing step portion 138d may be located proximate the trailing edge 38b of the cutting flute 38 and the leading edge portion 138c may be located proximate the leading edge 38a. The curved portion 138 may be located interposed between leading edge portion 138c and the trailing step portion 138d. The trailing step portion 138d extends from the trailing edge 38b to a trailing step location 144 and the leading edge portion 138c extends from the leading edge 38a to the transition location 142. The curved portion 138a extends from a transition location 142 to the trailing step location 144. The leading edge portion 138c may include a smooth transition to the curved portion 138a. The trailing step location 144 may be a rectilinear step. In an embodiment, the transition location 142 may be located closer to the leading edge 38a than the trailing edge 38b, as shown in FIG. 10. In an embodiment, the trailing step location 140 may be located closer to the trailing edge 38b than the leading edge 38a, as shown in FIG. 11. In another embodiment, the curved portion 138a may be circumferentially larger than the leading edge portion 138c and/or the trailing step portion 138d, as shown in FIG. 11.

The leading edge portion 138c may be located at a first radius R1 away from the axis of rotation CL1 at the leading edge 38a and then transition to a second radius R2 away from the axis of rotation CL1 at the transition location 142. The first radius R1 is also the radius of the first plane of rotation GC1 of the cutting flute 38, which is about equal to the radius (e.g., standard dimension, original blueprint/ drawing dimensions, etc.) of the weld gun cap 14 proximate the second section 124 when the weld gun cap is located within the tip dresser cutter 100.

The trailing step portion 138d may be curved in shape to match a curvature of the weld gun cap 14 proximate the second section 124 when the weld gun cap is located within the tip dresser cutter 100, as shown in FIG. 11. The trailing step portion 138d may alternatively be linear in shape along its circumference. The trailing step portion 138d may be curved in shape to match a curvature of a first plane of rotation GC1 of the cutting flute 38 revolving around the axis of rotation CL1 of the tip dresser cutter 100, as shown in FIG. 11. The first plane of rotation GC1 of the cutting flute 38 has a first radius R1 about equal to the radius (e.g., standard dimension, original blueprint/drawing dimensions, etc.) of the weld gun cap 14 proximate the second section 124 when the weld gun cap is located within the tip dresser cutter 100. The trailing step portion 138d may be located at a first radius R1 away from the axis of rotation CL1 of the tip dresser cutter 100 or at a position less than the second radius R2 away from the axis of rotation CL1 of the tip dresser cutter 100.

The curved portion 138a is about parallel to a plane of rotation (e.g., see GC2) of the cutting flute 38, as shown in FIG. 11. The curved portion 138a may be curved in shape to match a curvature of a second plane of rotation GC2 of the cutting flute 38 revolving around the axis of rotation CL1 of the tip dresser cutter 100, as shown in FIG. 11. The second plane of rotation GC2 of the cutting flute 38 has a second radius R2 greater than the first radius R1 of the first plane of rotation GC1 of the cutting flute 38 and the radius (e.g., standard dimension, original blueprint/drawing dimensions, etc.) of the weld gun cap 14 proximate the second section 124 when the weld gun cap is located within the tip dresser cutter 100. Thus, the curved portion 138a is recessed into the tip dresser cutter 100 radially outward towards the circumferential portion 108 relative to the leading edge portion 138c and the trailing step portion 138d. Therefore, each location along the curved portion 138a of the radially inward canted surface 138 within the second section 124 is located at a distance away from the axis of rotation CL1 that is about equal to the second radius R2.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A tip dresser cutter, comprising:
    a circumferential portion having a circular shape rotatable about an axis of rotation;
    a center portion located radially inward from the circumferential portion proximate the axis of rotation; and
    a cutting flute extending radially between the center portion and the circumferential portion, the cutting flute comprising a leading edge, a trailing edge, a radially inward canted surface extending between the leading edge and the trailing edge,
    wherein the radially inward canted surface comprises:
        a first section extending between the center portion proximate the axis of rotation and a first location on the cutting flute; and a second section extending between the first location on the cutting flute and a second location on the cutting flute, the second section of the radially inward canted surface comprising a curved portion that is parallel to a plane of rotation of the cutting flute, wherein the second section of the radially inward canted surface further comprises a leading edge portion located proximate the leading edge, the leading edge portion including a smooth transition to the curved portion that is recessed relative to the leading edge portion.

2. The tip dresser cutter of claim 1, wherein the second section of the radially inward canted surface further comprises a leading step portion located proximate the leading edge.

3. The tip dresser cutter of claim 2, wherein the curved portion is recessed into the tip dresser cutter radially outward towards the circumferential portion relative to the leading step portion.

4. The tip dresser cutter of claim 1, wherein the second section of the radially inward canted surface further comprises a trailing step portion located proximate the trailing edge.

5. The tip dresser cutter of claim 4, wherein the curved portion is recessed into the tip dresser cutter radially outward towards the circumferential portion relative to the trailing step portion.

6. The tip dresser cutter of claim 1, wherein the second section of the radially inward canted surface further comprises a trailing step portion located proximate the trailing edge, wherein the curved portion is located interposed between the leading edge portion and the trailing step portion.

7. The tip dresser cutter of claim 6, wherein the leading edge portion extends from the leading edge to a transition location, the trailing step portion extends from the trailing edge to a trailing step location, and the curved portion extends from the transition location to the trailing step location.

8. The tip dresser cutter of claim 7, wherein the leading edge portion at the leading edge is located at a first radius away from the axis of rotation of the tip dresser cutter and the curved portion is located at a second radius away from the axis of rotation of the tip dresser cutter, the second radius being greater than the first radius.

9. The tip dresser cutter of claim 8, wherein the trailing step portion is located at the first radius away from the axis of rotation of the tip dresser cutter or at a position less than the second radius away from the axis of rotation of the tip dresser cutter.

10. The tip dresser cutter of claim 1, wherein the leading edge portion extends from the leading edge to a transition location and the curved portion extends from the trailing edge to the transition location.

11. The tip dresser cutter of claim 10, wherein the leading edge portion at the leading edge is located at a first radius away from the axis of rotation of the tip dresser cutter and the curved portion is located at a second radius away from the axis of rotation of the tip dresser cutter, the second radius being greater than the first radius.

12. The tip dresser cutter of claim 1, wherein the curved portion is recessed into the tip dresser cutter radially outward towards the circumferential portion relative to the leading edge portion.

13. The tip dresser cutter of claim 1, wherein the curved portion encompasses a portion of the radially inward canted surface within the second section and not the entire radially inward canted surface within the second section.

14. The tip dresser cutter of claim 13, wherein the second section of the radially inward canted surface further comprises:

a second portion that excludes the curved portion, wherein at least one location in the second portion of the radially inward canted surface within the second section is located at a first distance away from the axis of rotation that is equivalent to a first radius, and wherein each location along the curved portion of the radially inward canted surface within the second section is located at a second distance away from the axis of rotation that is equivalent to a second radius that is greater than the first radius.

15. A tip dresser cutter, comprising:

a circumferential portion having a circular shape rotatable about an axis of rotation;

a center portion located radially inward from the circumferential portion proximate the axis of rotation; and a cutting flute extending radially between the center portion and the circumferential portion, the cutting flute comprising a leading edge, a trailing edge, a radially inward canted surface extending between the leading edge and the trailing edge, wherein the radially inward canted surface comprises:

a first section extending between the center portion proximate the axis of rotation and a first location on the cutting flute; and a second section extending between the first location on the cutting flute and a second location on the cutting flute, the second section of the radially inward canted surface comprising a curved portion that is parallel to a plane of rotation of the cutting flute, wherein the second section of the radially inward canted surface further comprises a leading step portion located proximate the leading edge, and wherein the curved portion is recessed into the tip dresser cutter radially outward towards the circumferential portion relative to the leading step portion.

16. The tip dresser cutter of claim 15, wherein the leading step portion extends from the leading edge to a leading step location and the curved portion extends from the trailing edge to the leading step location.

17. The tip dresser cutter of claim 16, wherein the leading step portion is located at a first radius away from the axis of rotation of the tip dresser cutter and the curved portion is located at a second radius away from the axis of rotation of the tip dresser cutter, the second radius being greater than the first radius.

18. The tip dresser cutter of claim 15, wherein the curved portion encompasses a portion of the radially inward canted surface within the second section and not the entire radially inward canted surface within the second section.

19. The tip dresser cutter of claim 18, wherein the second section of the radially inward canted surface further comprises:

a second portion that excludes the curved portion, wherein at least one location in the second portion of the radially inward canted surface within the second section is located at a first distance away from the axis of rotation that is equivalent to a first radius, and wherein each location along the curved portion of the radially inward canted surface within the second section is located at a second distance away from the axis of rotation that is equivalent to a second radius that is greater than the first radius.

20. A tip dresser cutter, comprising:
- a circumferential portion having a circular shape rotatable about an axis of rotation;
- a center portion located radially inward from the circumferential portion proximate the axis of rotation; and
- a cutting flute extending radially between the center portion and the circumferential portion, the cutting flute comprising a leading edge, a trailing edge, a radially inward canted surface extending between the leading edge and the trailing edge, wherein the radially inward canted surface comprises:
- a first section extending between the center portion proximate the axis of rotation and a first location on the cutting flute; and
- a second section extending between the first location on the cutting flute and a second location on the cutting flute, the second section of the radially inward canted surface comprising a curved portion that is parallel to a plane of rotation of the cutting flute, wherein at least one of the following:
(1) the second section of the radially inward canted surface further comprises a trailing step portion located proximate the trailing edge, and wherein the curved portion is recessed into the tip dresser cutter radially outward towards the circumferential portion relative to the trailing step portion; or
(2) the curved portion encompasses a portion of the radially inward canted surface within the second section and not the entire radially inward canted surface within the second section, and wherein the second section of the radially inward canted surface further comprises: a second portion that excludes the curved portion, wherein at least one location in the second portion of the radially inward canted surface within the second section is located at a first distance away from the axis of rotation that is equivalent to a first radius, and wherein each location along the curved portion of the radially inward canted surface within the second section is located at a second distance away from the axis of rotation that is equivalent to a second radius that is greater than the first radius.

* * * * *